United States Patent [19]

Newstead

[11] 4,040,506
[45] Aug. 9, 1977

[54] HYDRAULICALLY OPERATED DISC BRAKES FOR VEHICLES

[75] Inventor: Charles Newstead, Walsall, England

[73] Assignee: Girling Limited, Birmingham, England

[21] Appl. No.: 660,973

[22] Filed: Feb. 24, 1976

Related U.S. Application Data

[60] Division of Ser. No. 559,591, March 18, 1975, Pat. No. 3,966,025, which is a continuation of Ser. No. 464,222, April 25, 1974, abandoned, which is a continuation of Ser. No. 170,254, Aug. 9, 1971, abandoned.

[30] Foreign Application Priority Data

Aug. 21, 1970 United Kingdom ............... 40275/70

[51] Int. Cl.² .......................................... F16D 55/228
[52] U.S. Cl. .............................. 188/72.5; 188/106 P; 192/87.11
[58] Field of Search ................... 188/71.5, 72.4, 72.5, 188/72.6, 106 P, 370; 192/87.11; 92/128, 172

[56] References Cited

U.S. PATENT DOCUMENTS

| 2,214,762 | 9/1940 | Eksergian | 188/72.5 |
| 2,273,345 | 2/1942 | Burrell | 188/72.4 |
| 2,635,714 | 4/1953 | Butler | 188/71.5 |
| 2,672,223 | 3/1954 | Butler | 188/72.4 |
| 2,689,024 | 9/1954 | Trevaskis | 188/72.4 |
| 2,804,176 | 8/1957 | Trevaskis | 188/71.5 |
| 2,835,350 | 5/1958 | Butler | 188/72.4 |

FOREIGN PATENT DOCUMENTS

| 1,552,836 | 12/1968 | France | 188/72.4 |
| 2,141,857 | 3/1972 | Germany | 188/72.5 |
| 202,243 | 8/1923 | United Kingdom | 92/172 |

*Primary Examiner*—Trygve M. Blix
*Assistant Examiner*—Edward R. Kazenske
*Attorney, Agent, or Firm*—Imirie, Smiley & Linn

[57] ABSTRACT

A disc brake comprises a fluid pressure-operated actuator for urging two pressure plates carrying friction pads to opposite faces of a disc. In the actuator a piston movable in a housing is detachably engaged with a draw-bar which acts on one of the pressure plates, the housing acting directly on the second pressure plate. A seal between the housing and the draw-bar contacts an enlarged portion of the draw-bar. Apparatus is provided to prevent the draw-bar from rotating.

7 Claims, 5 Drawing Figures

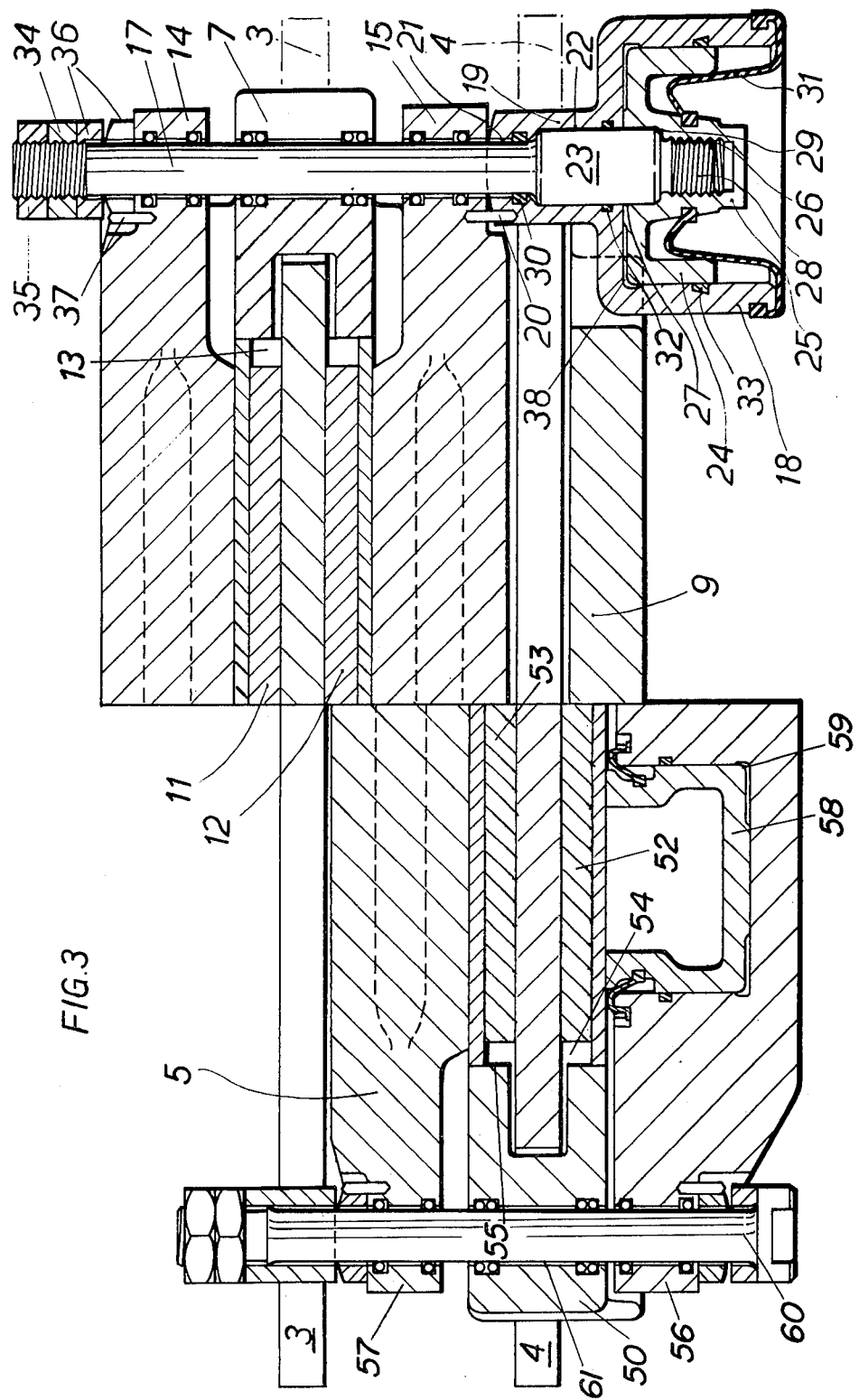

HYDRAULICALLY OPERATED DISC BRAKES FOR VEHICLES

This application is a divisional of application Ser. No. 559,591 filed Mar. 18, 1975, now U.S. Pat. No. 3,966,025, which is a continuation of application Ser. No. 464,222 filed Apr. 25, 1974, and now abandoned, which is a continuation of application Ser. No. 170,254 filed Aug. 9, 1971, and now abandoned.

This invention relates to improvements in fluid pressure-operated disc brakes of the kind in which pressure plates for applying friction pads to opposite faces of a rotatable disc are urged towards each other in the application of the brake by at least one fluid pressure-operated actuator comprising a wall movable in a housing and acting on one pressure plate through a draw-bar which extends axially through a closed end of the housing and over the peripheral edge of the disc to apply a friction pad to one face of the disc, the other friction pad being applied to the opposite face of the disc by the housing which acts directly on the other pressure plate.

When a disc brake of the kind set forth is installed in a vehicle in which there is a space on the inboard side of the disc opposite to the wheel it is preferable for the actuator to be located in that space since the fluid pressure medium and seals between the piston and the housing are constantly exposed to a cooling draught when the vehicle is in motion. This has the advantage that the life of the seals is increased and problems associated with expansion and or varpourisation of the fluid pressure medium at high temperatures are reduced or substantially eliminated.

In such installation it is desirable to provide a detachable engagement between the movable wall and the draw bar to enable the movable wall to be withdrawn from the open-inboard end of the housing in order to inspect and replace the seals without first having to remove the wheel.

In one known form of brake of the kind set forth, in which the actuator comprises an hydraulic actuator in the form of a piston and cylinder assembly located in a space on the inboard side of the disc opposite to the wheel, the draw-bar is of a constant diameter throughout its axial length and has a detachable screw-threaded engagement with the piston over its full diameter. Thus, in assembling the brake, the screw-threaded end portion must be inserted in the cylinder housing through an hydraulic seal in the closed end of the housing to effect the screw-threaded engagement with the piston. This is undesirable since, during assembly, the screw-threads on the draw-bar may cut or otherwise damage that seal.

According to our invention, in a fluid pressure-operated disc brake of the kind set forth the draw-bar has a portion of enlarged diameter which terminates in a shoulder towards the inner end of the draw-bar, the inner end portion of the draw-bar being screw-threaded at least at its distal end, and the inner end portion of the draw-bar is received in a longitudinally extending bore in the movable wall, the movable wall being counterbored from the end adjacent the closed end of the housing to receive the enlarged portion of the draw-bar, the shoulder engaging with the step in diameter in the movable wall, a first seal between the enlarged portion of the draw-bar and the closed end of the housing being located in the wall of the housing.

Sealing the draw-bar to the housing over a portion of enlarged diameter ensures that, when the brake is assembled, the screw-threads do not contact the first seal.

Where a second seal is provided between the enlarged portion of the draw-bar and the movable wall and the second seal is located in the wall of the counterbore, when the movable wall is to be detached from the draw-bar and withdrawn from the open outer end of the housing, the screw-threads can not contact the second seal.

Means are incorporated for preventing rotation of the draw-bar when the movable wall is mounted on or withdrawn from the draw-bar.

Our invention is particularly applicable to brakes of the kind set forth in which the pressure members are chordal with respect to the disc and are urged towards each other in the application of the brake by a pair of circumferentially spaced hydraulic actuators each comprising a piston working in a cylindrical housing and acting between complementary end portions of the pressure plates which extend outwardly beyond the peripheral edge of the disc, and the draw-bars project through openings in a stationary drag-taking member in which the friction pads are guided.

According to another aspect of our invention in a fluid pressure-operated disc brake of the kind set forth the draw-bar is detachably engaged with the movable wall and means are incorporated for preventing rotation of the draw-bar. The draw-bar may be keyed to a nonrotatable part of the brake or alternatively the means may be adapted for co-operation with a hand tool.

A disc brake assembly incorporating a disc brake in accordance with our invention, and a modified actuator are illustrated in the accompanying drawings in which:

FIG. 3 is a section on the line 3—3 of FIG. 2;

Figure 1:
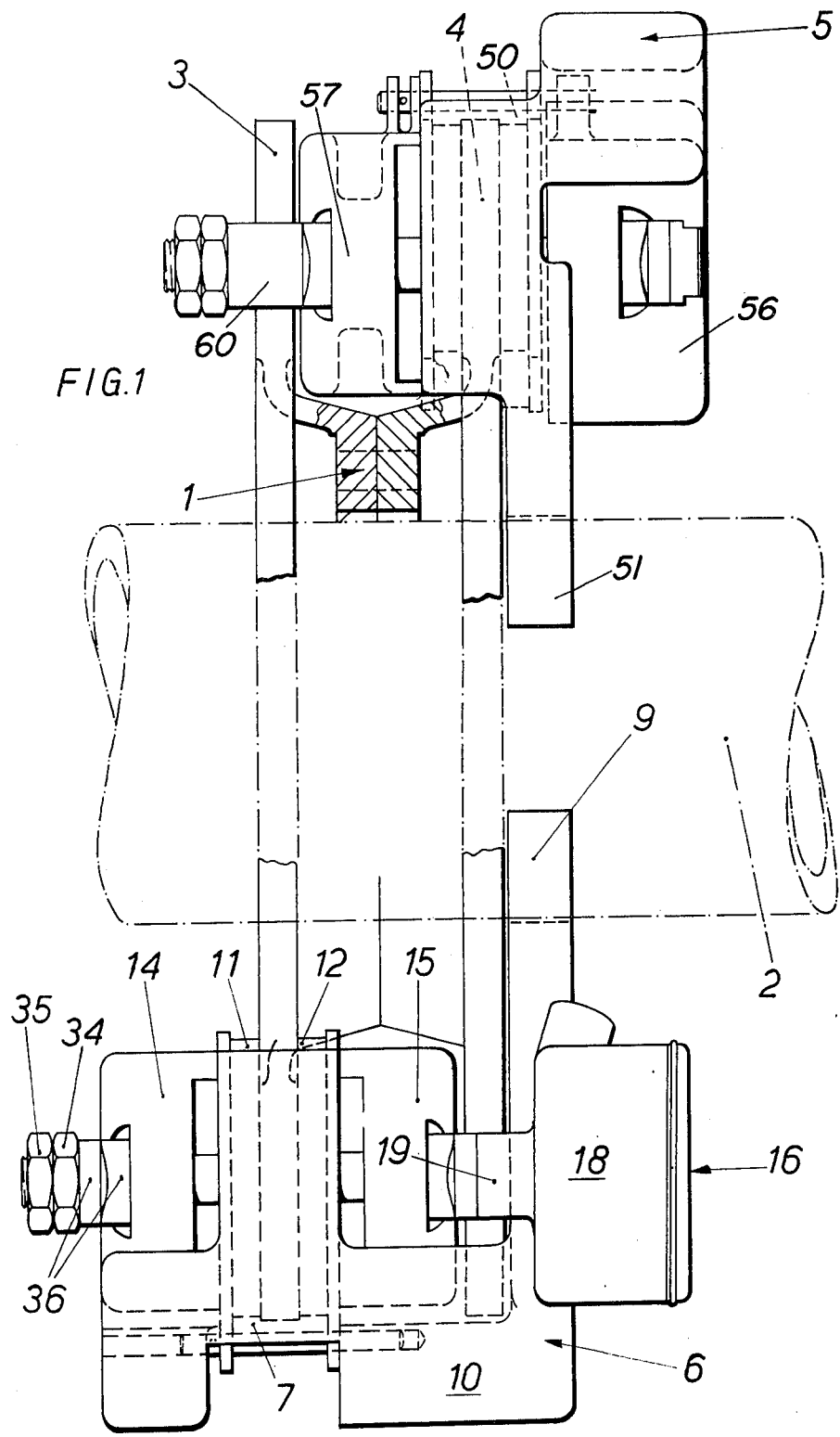
FIG. 1 is a side view of the brake including a part section through a rotatable disc assembly.
Figure 2:
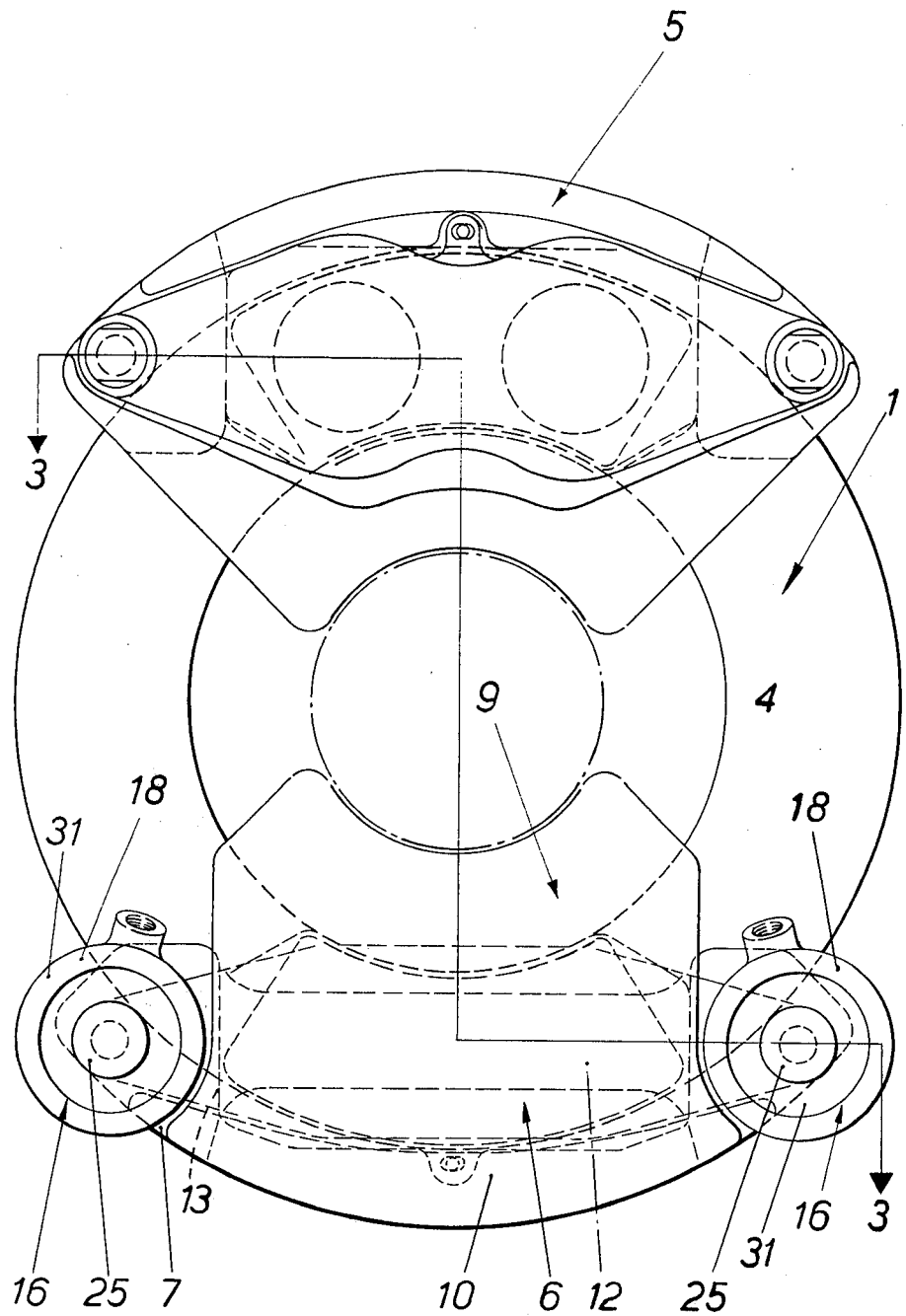
FIG. 2 is a front view of the inboard side of the brake illustrated in FIG. 1 on the axis of the brake.

In the disc brake assembly illustrated in FIGS. 1 to 4, 1 is a rotatable disc assembly for rotation with an axle 2 and comprising a pair of identical dish-shaped discs which are bolted together in back-to-back relationship to define a pair of axially spaced annular braking flanges 3 and 4.

The disc brake assembly includes two diametrically opposed disc brakes 5 and 6 each applying a braking force to a different braking flange.

The disc brake 5 for applying a braking force to the inboard flange 4 comprises a stationary drag-taking member 50 of arcuate outline and substantially U section which straddles a portion of the periphery of that flange 4. The drag-taking member 50 is carried from an inwardly directed radial extension 51 which is secured to a stationary part adjacent to the face of the inboard disc 4 which is remote from the outboard disc 3.

Friction pad assemblies 52 and 53 for engagement with opposite faces of the flange 4 are guided for movement towards and away from the flange 4 in an opening 54 in the drag-taking member 50 which is of substantial circumferential length and which is open at its radially outermost end to permit the insertion into and removal from, the brake, of the friction pad assemblies 52, 53.

Each friction pad assembly comprises a friction pad of segmental outline carried by a rigid backing plate and, in the application of the brake, the drag on the friction pad assemblies is taken by end walls 55 of the opening 54.

The friction pad assemblies 52, 53 are applied to opposite faces of the flange 4 in the application of the brake by a pair of pressure plates 56, 57 which are chordal with respect to the flange 4 and are located on opposite sides of the drag-taking member 50. The friction pad assembly 52 is applied directly to the adjacent outer face of the flange 4 by hydraulic pistons 58 working in spaced cylinders 59 in the pressure plate 56, and the other friction pad assembly 53 is applied to the opposite side of the flange 4 which is adjacent to the flange 3 by movement of the pressure plate 57 in the opposite direction when the cylinders are pressurised. This movement is transmitted to the pressure plate 57 through a pair of draw-bars 60 which extend through openings 61 in the drag-taking member 50. The openings 61 are located at circumferentially spaced positions which lie outside the peripheral edge of the flange 4.

The disc brake 6 for applying a braking force to the outboard flange 3 comprises a stationary drag-taking member 7 of arcuate outline and substantilly U section which straddles a portion of the periphery of that flange 3. The drag-taking member 7 is carried from the outer end of an inwardly extending support 9 secured to a stationary part adjacent to the inboard flange 4 by means of an axial extension 10 lying outside the peripheral edge of the flange 4.

Friction pad assemblies 11, 12 for engagement with opposite faces of the outboard flange 3 are guided for movement towards and away from the flange 3 in an opening 13 in the drag-taking member 7 which is of substantial circumferential length and which is open at its radially outermost end to permit the insertion into and removal from, the brake, of the friction pad assemblies 11, 12. Each friction pad assembly comprises a friction pad of segmental outline carried by a rigid backing plate and, in the application of the brake, the drag on the friction pad assemblies is taken by the end walls of the opening 13 in the drag-taking member 7.

The friction pad assemblies 11, 12 are applied to opposite faces of the flange 3 in the application of the brake by a pair of pressure plates 14, 15 which are chordal with respect to the flange 3 and are located on opposite sides of the drag-taking member 7. The inboard pressure plate 15 is located between the flange 3 and 4. The outer ends of the pressure plates 14, 15, which lie outside the peripheral edges of the flanges 3 and 4, are connected by a pair of hydraulic actuators 16 in accordance with our invention.

Each hydraulic actuator 16 comprises an axially extending draw-bar 17 which extends through aligned openings in the pressure plates 14 and 15 and the drag-taking member 7.

An open-ended cylindrical housing 18 is provided with an axial extension 19 in abutment at its innermost end with the pressure plate 15 and the housing 18 is keyed to the pressure plate 15 against rotation by a spigot location 20. The axial extension 19 is provided with a longitudinal bore 21 through which the draw-bar is inserted, and the bore 21 is counterbored at 22 from its outermost end to receive a portion 23 of enlarged diameter on the draw-bar 17.

The portion 23 extends into the bore of the housing in which works a cup-shaped hydraulic piston 24 having an outwardly extending central boss 25. The boss 25 is bored at 26 for substantially the whole of its axial length and is counterbored at its open end at 27 to receive the outer end of the portion 23. The bore 26 is screw-threaded internally to receive a screw-threaded portion 28 of reduced diameter leading from the portion 23 and terminating at the free end of the draw-bar 17. The outer end of the portion 23 abuts against a shoulder 29 at the change in diameter between the bore 26 and the counterbore 27.

An annular sealing ring 30 is located in a recess in the wall of the bore 21 of the extension 19 to form a seal with the portion of the draw-bar outwardly of the enlarged portion 23, and a flexible diaphragm or other resilient boot 31 is fitted between the wall or the cylinder housing 18 and the boss 25 to prevent the ingress of foreign matter into the bore of the housing 18. A static seal 32 is housed in an annular recess in the wall of the housing to form a seal with the enlarged portion 23 of the draw-bar 17, and the piston 24 works through an annular seal 33 in the internal wall of the cylindrical housing 18.

The end of the draw-bar 17 remote from the piston 24 projects from the pressure plate 14 and is screw-threaded to receive a nut 34 and a locking nut 35 which serve to retain the extension 19 of the housing 18 in abutment with the pressure plate 15, and hold a pair of thrust washers 36 located between the nut 34 and the pressure plate 14, in engagement. The innermost thrust washer 36 is keyed to the pressure plate 14 against rotation by means of a spigot 37.

In the application of the brake hydraulic fluid pressure is applied simultaneously to annular spaces 38 between the piston 24 and cylinder housing 18 of each hydraulic actuator. This causes the housing 18 and the piston 24 to move in opposite directions away from each other with the result the friction pad assembly 12 is applied directly to the disc by the engagement with the pressure plate 15 of the cylinder housing 18. The other friction pad assembly 11 is applied directly to the opposite face of the disc through the pressure plate 14 due to the action of the piston 24 urging the draw-bar 19 in the opposite direction.

To remove the piston 24 for replacement of a seal 33 in the wall of the cylinder bore, the boot 31 is removed and the piston 24 unscrewed from its engagement with the draw-bar 17. This permits the piston to be withdrawn from the outer end of the cylindrical housing 18 on the inboard side of the disc assembly 3. The draw-bar 17 may be keyed to one of the pressure plates against rotation with respect to the housing 18.

The disc brake 5 is conveniently of the construction forming the subject of our British Patent Specification No. 1,193,641 and need not be described further herein.

Figure 5:
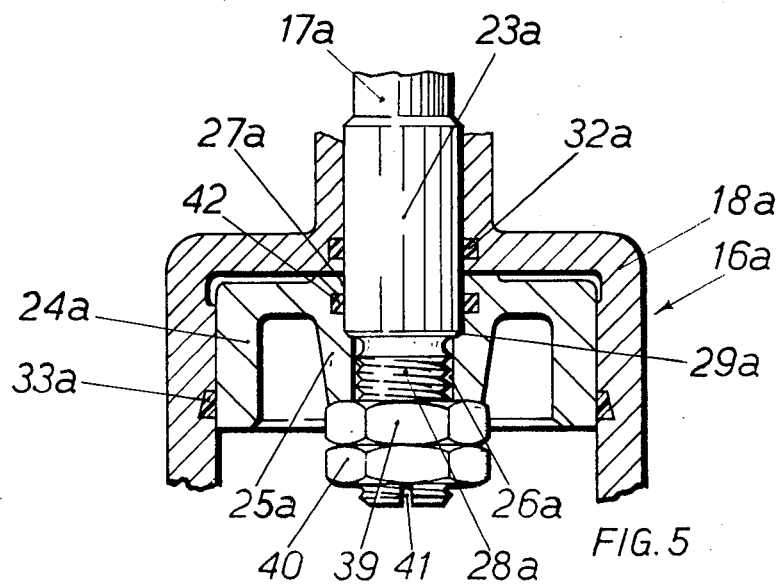
FIG. 5 is a longitudinal section through a modified hydraulic actuator for use in the brake of FIGS. 1 to 3.
Figure 4:
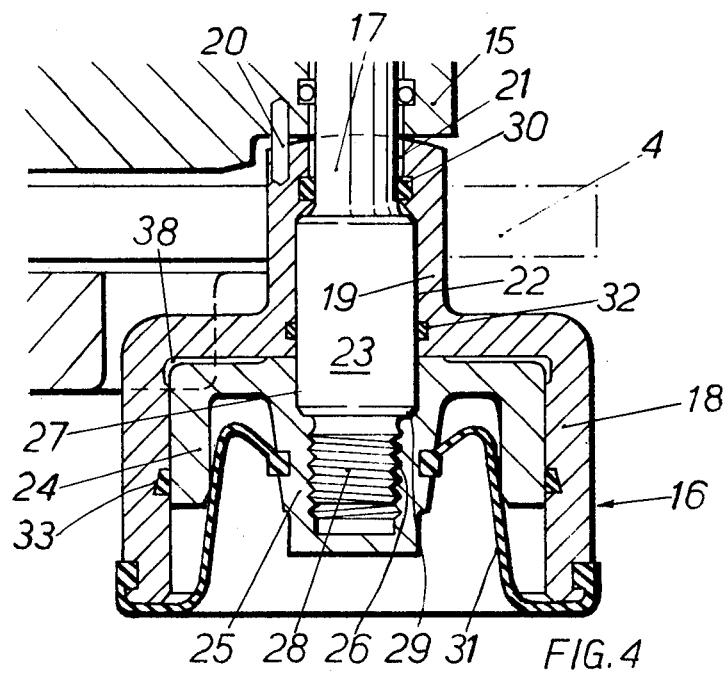
FIG. 4 is a section on an enlarged scale of a portion of the brake illustrated including the hydraulic actuator shown in FIG. 3.

In the modified hydraulic actuator illustrated in FIG. 5 corresponding reference numerals qualified by the suffix *a* have where appropriate, been applied to corresponding parts. In that embodiment the bore 26*a* in the piston 24*a* is plain and extends to the free end of the boss 25*a*. The screw-threaded portion 28*a* at the free end of the draw-bar 17*a* is increased in length to project from the boss 25*a* when the outer end of the portion 23*a* of the draw-bar 17*a* is in abutment with the shoulder 29*a*. A nut 39 and a lock-nut 40 are screwed onto the threaded portion 28*a* at the free end of the draw-bar 17*a* which projects from the piston 24*a* to prevent relative movement between the piston 24*a* and the draw-bar 17*a* taking place in an axial direction.

The free end of the threaded portion 28a of the draw-bar 17a which projects from the boss 25a is provided with a slot 41 to receive the blade of a tool, for example a screw-driver, by means of which the draw-bar 17a can be held against rotation when the nuts 39 and 40 are unscrewed therefrom. Thereafter the piston 24a can be slid off the draw-bar 17a.

In the embodiment of FIG. 5 a stationary annular seal 42 located in the wall of the counterbore 27a in the piston 24a provides a seal with the portion 23a of the draw-bar. Alternatively a seal could be inserted between the interface of shoulder 29a and the complementary outer end of the portion 23a.

When the piston 24a is withdrawn from the cylinder housing 18a there is no danger of the screw-threads at the free end of the draw-bar 17a contacting the seal 42 as these screw-threads are provided on a portion of the draw-bar 17a which is of smaller diameter than that of the enlarged portion 23a.

In a modification each hydraulic actuator may be replaced by a booster of the vacuum or air suspended type comprising a movable wall in the form of a piston or diaphragm assembly located within a housing to define in the housing separate chambers of constant and variable pneumatic pressures respectively. When a pressure differential is established across the movable walls, the walls move axially in the housings to urge the pressure plates 14 and 15 towards each other by the application of a force to the pressure plate 14 through the draw-bars 17, 17a and by the direct engagement of the housing with the pressure plate 15.

In a further embodiment, not illustrated, the hydraulic actuators 16 are supported against excessive movement in all but the axial directions by a plannar actuator support member which is located between the hydraulic actuators 16 and attached to the hydraulic actuators 16. The actuator support member is floatingly mounted, for example by way of rubber 0 rings housed in an annular recess in each of a pair of through bores in the actuator support member, the internal diameter of the 0 rings being less than the through bore diameter, on a pair of pins which are rigidly attached to and protrude axially from the inwardly extending brake support member 9. The hydraulic actuators 16 are thus free to move axially as the friction pads wear, carrying the actuator support member with them as they do so, but restrained from excessive movement in any other direction by the connection of the actuator support member to the brake support member by way of the pins.

In a modification each hydraulic actuator 16 may be supported by a separate actuator support member mounted in the manner previously described, to the brake support member 1.

In a further modification the mounting pins are provided on the actuator support member. The floating mounting for the pins being formed in holes provided in the brake support member 9.

In yet a further modification the actuator support is restrained against axial movement and the hydraulic actuators are slidingly supported on the actuator support member.

I claim:

1. A disc brake assembly for a vehicle including a first axially fixed outboard rotatable disc, a second axially fixed inboard rotatable disc rotatable with and spaced axially from said first disc, in an inborad direction, each disc having an inner face, an outer face, a radially innermost peripheral edge from which said disc is driven, and a free radially outermost peripheral edge, said inner face of said first outboard disc facing said inner face of said second inboard disc and said outer face of each disc facing outwardly away from the other disc, a first pair of friction pads for engagement with said inner and said outer faces of said first outboard disc, a second pair of friction pads for engagement with said inner and said outer faces of said second inboard disc, first and second fluid-pressure operated actuators for applying said first and second pairs of friction pads to said inner and outer faces of each respective said first and second disc, said first and second actuators being both located adjacent to said outer face of said second inboard disc, a first pair of inner and outer axially movable pressure plates for urging said first pair of friction pads into engagement with said inner and outer faces of said first outboard disc, a second pair of inner and outer axially movable pressure plates associated with said second pair of friction pads, said second actuator comprising means for axially moving said second pair of inner and outer pressure plates and for urging said second pair of friction pads into engagement with said inner and outer faces of said second inboard disc and including an applying portion extending over said outermost peripheral edge of said inboard disc and wherein said first actuator comprises a pair of circumferentially spaced hydraulic cylinders, a piston working in each hydraulic cylinder, a co-axial tubular portion carried by each cylinder, extending over said outermost peripheral edge of second inboard disc, and acting on said inner pressure plate of said first pair to apply an adjacent friction pad to said inner face of said first disc, and a draw-bar guided through each tubular portion and through which said last mentioned piston acts on said outer pressure plate of said first pair to apply the other friction pad of said first pair to said outer face of said first disc, both said pressure plates of said first pair lying on a first common chord passing through the centers of pressure of said first pads, and including a first stationary member straddling the outermost peripheral edge of said first outboard disc and extending over said outermost peripheral edge of said inboard disc, said first stationary member having a gap in which said first pair of friction pads are located and are guided for movement towards and away from said first disc, and said stationary member also having circumferentially spaced openings through which said draw-bars of said first actuator are slidably guided, and a relatively stationary part adjacent to said outer face of said inboard disc, and to which said first stationary member is secured.

2. A disc brake assembly as claimed in claim 1, comprising a detachable connection between each said piston of said first actuator and said respective draw-bar on which the said piston acts.

3. A disc brake assembly as claimed in claim 2, wherein each said detachable connection comprises a screw-threaded portion on said draw-bar, and said piston is provided with a threaded bore in which said screw-threaded portion is received, and means are provided for keying said tubular portion of each cylinder against rotation with respect to said inner pressure plate of said first pair.

4. A disc brake assembly as claimed in claim 2, wherein each said detachable connection comprises a screw-threaded free end portion on said draw-bar, and said piston is provided with a through-bore through which said free end portion projects, at least one nut be screwed onto said free end portion to retain said piston or said draw-bar, and means are provided for holding said draw-bar against rotation when said nut is screwed onto said draw-bar.

5. A disc brake assembly as claimed in claim 1, wherein said means of said second actuator comprising at least one hydraulic piston working in a cylinder bore associated with said outer pressure plate of said second pair of pressure plates and acting directly on one of said friction pads of said second pair to apply it to said outer face of said inboard disc, and said applying portion of said second actuator comprising a pair of circumferentially spaced draw-bars couple said last mentioned outer pressure plate to said inner pressure plate of said second pair so that the hydraulic reaction is transmitted to the friction pad for engagement with said inner face of said second disc, including a second stationary member straddling said outermost peripheral edge of said second inboard disc and also secured to said relatively stationary part, said second stationary member having a gap in which said second pair of friction pads are located and are guided for movement towards and away from said second inboard disc with said gap being open at its radially outermost end to permit removal of said second pair of friction pads, and said second stationary member also having circumferentially spaced openings through which said last-mentioned draw-bars are slidably guided.

6. A disc brake assembly as claimed in claim 1, wherein said gap in said first stationary member is open at its radially outermost end to permit withdrawal in a radially outwards direction of said first pair of pads from said brake.

7. A disc brake assembly as claimed in claim 1, wherein said tubular portions are in abutment with said inner pressure plate of said first pair.

* * * * *